(12) United States Patent
Schröder-Grimonpont et al.

(10) Patent No.: US 9,181,466 B2
(45) Date of Patent: Nov. 10, 2015

(54) MICROCAPSULES WITH A PARAFFIN COMPOSITION AS CAPSULE CORE

(75) Inventors: Tina Schröder-Grimonpont, Rheinzabern (DE); Hans Willax, Maxdorf (DE); Britta Katz, Dannstadt-Schauernheim (DE); Jutta Brust, Kallstadt (DE); Stephan Altmann, Ruppertsberg (DE); Marco Schmidt, Speyer (DE)

(73) Assignee: BASF SE, Ludwigshafen (DE)

( * ) Notice: Subject to any disclaimer, the term of this patent is extended or adjusted under 35 U.S.C. 154(b) by 569 days.

(21) Appl. No.: 13/372,864

(22) Filed: Feb. 14, 2012

(65) Prior Publication Data

US 2012/0205576 A1 Aug. 16, 2012

Related U.S. Application Data

(60) Provisional application No. 61/443,271, filed on Feb. 16, 2011.

(51) Int. Cl.
| | | |
|---|---|---|
| *C09K 5/06* | (2006.01) | |
| *B32B 1/00* | (2006.01) | |
| *B01J 13/14* | (2006.01) | |
| *B01J 13/18* | (2006.01) | |
| *F28F 23/00* | (2006.01) | |

(52) U.S. Cl.
CPC ............... *C09K 5/063* (2013.01); *B01J 13/14* (2013.01); *B01J 13/185* (2013.01); *F28F 23/00* (2013.01)

(58) Field of Classification Search
CPC .... C04B 2111/28; C04B 26/00; C04B 16/00; C04B 2111/00603; C04B 2111/0062; C09K 5/063; C09K 5/00; C09K 5/04; C09K 5/06; C08L 91/06; A61K 8/11; F28D 20/023; F28D 20/02; F28D 15/00
USPC ............ 252/70; 428/195, 206, 141, 221, 428/402–402.24, 403, 404, 407, 321.1, 428/474.4; 427/331, 389.9, 212, 427/213–213.36, 483, 256; 264/534, 5, 41, 264/4–4.7; 424/400, 408, 450, 451, 455, 424/93.7, 184.1, 497, 489, 501, 490, 491, 424/492, 493, 494, 495
See application file for complete search history.

(56) References Cited

U.S. PATENT DOCUMENTS

| | | | |
|---|---|---|---|
| 6,230,444 B1 * | 5/2001 | Pause ................................... 52/1 | |
| 2004/0234738 A1 * | 11/2004 | Jahns et al. ..................... 428/221 | |
| 2007/0248824 A1 | 10/2007 | Lang-Wittkowski et al. | |
| 2008/0318048 A1 | 12/2008 | Amrhein et al. | |
| 2009/0256107 A1 | 10/2009 | Hentze et al. | |
| 2009/0289216 A1 | 11/2009 | Jung et al. | |
| 2010/0261839 A1 | 10/2010 | Jung | |
| 2012/0076843 A1 | 3/2012 | Jung et al. | |
| 2012/0177924 A1 | 7/2012 | Jung et al. | |

FOREIGN PATENT DOCUMENTS

| | | |
|---|---|---|
| CN | 1993444 A | 7/2007 |
| DE | 2214410 | 10/1973 |
| DE | 24 45 813 | 4/1976 |
| DE | 44 19 518 A1 | 12/1995 |
| DE | 44 35 422 A1 | 4/1996 |
| DE | 44 35 423 A1 | 4/1996 |
| DE | 196 23 413 A1 | 12/1997 |
| DE | 196 29 525 A1 | 1/1998 |
| DE | 196 29 526 A1 | 1/1998 |
| DE | 101 39 171 A1 | 2/2003 |
| EP | 0 407 889 A1 | 1/1991 |
| EP | 1 029 018 B1 | 9/2001 |
| EP | 0 784 449 B1 | 1/2003 |
| EP | 1 321 182 A1 | 6/2003 |
| WO | WO 96/03923 A1 | 2/1996 |
| WO | WO 99/24525 | 5/1999 |
| WO | WO 2005/116559 A1 | 12/2005 |
| WO | WO 2006/092439 A1 | 9/2006 |
| WO | WO 2008/006762 A2 | 1/2008 |
| WO | WO 2008/046839 A1 | 4/2008 |
| WO | WO 2008/071649 A2 | 6/2008 |
| WO | WO 2009/077525 A2 | 6/2009 |
| WO | WO 2010/145993 A2 | 12/2010 |
| WO | WO 2011/004006 A2 | 1/2011 |
| WO | WO 2011/039177 A1 | 4/2011 |

OTHER PUBLICATIONS

International Search Report and Written Opinion issued Jul. 25, 2012 in PCT/EP2012/052383 filed Feb. 13, 2012 with English translation of categories of cited documents.
U.S. Appl. No. 13/383,334, filed Jan. 10, 2012, Jung, et al.
U.S. Appl. No. 13/499,502, filed Mar. 30, 2012, Willax, et al.
U.S. Appl. No. 61/327,729, filed Apr. 26, 2010, Schroeder-Grimonpont, et al.

* cited by examiner

*Primary Examiner* — James J Seidleck
*Assistant Examiner* — S. Camilla Pourbohloul
(74) *Attorney, Agent, or Firm* — Oblon, McClelland, Maier & Neustadt, L.L.P.

(57) ABSTRACT

Microcapsules of the present invention have a core and a wall. The wall is made of a polymer, which by weight is from 40 to 90% $C_1$-$C_{24}$-alkyl ester of acrylic acid, methacrylic acid, or both ("first monomer"); from 10 to 60% an ethylenically unsaturated crosslinker; and from 0 to 30% an ethylenically monounsaturated monomer different from the first monomer. At least 80% of the crosslinker is has three or more ethylenically unsaturated radicals. The core is made of a paraffin composition, which by weight has from 35 to 98% n-octadecane; from 1 to 10% $C_{20}$-$C_{24}$-aliphatic, diisopropylnaphthalene, or both; from 1 to 5% wax with a melting point >40° C.; and from 0 to 50% n-hexadecane. The present invention also relates to a process for preparing the microcapsules and to their use in binding construction materials, textiles, and heat transfer liquids.

20 Claims, No Drawings

MICROCAPSULES WITH A PARAFFIN COMPOSITION AS CAPSULE CORE

The present invention relates to microcapsules comprising a paraffin composition as capsule core and a polymer as capsule wall formed from $C_1$-$C_{24}$-alkyl esters of acrylic acid and/or methacrylic acid, ethylenically unsaturated crosslinkers and also optionally other monomers. Furthermore, the present invention relates to a process for their preparation and to their use in binding construction materials, textiles and heat transfer liquids.

In recent years, there have been diverse developments in the field of microencapsulated latent heat storage materials. The mode of function of the latent heat storage materials, often also referred to as PCM (phase change material), is based on the transformation enthalpy which arises during the solid/liquid phase transition and signifies an absorption of energy or release of energy to the surrounding area. They can therefore be used for keeping a temperature constant within a fixed temperature range.

For example, EP-A-1 029 018 and EP-A 1 321 182 teach the use of microcapsules with a capsule wall made of highly crosslinked methacrylic acid ester polymer and a latent heat storage core in binding construction materials such as concrete or gypsum. DE-A-101 39 171 describes the use of microencapsulated latent heat storage materials in gypsum construction boards. The microcapsule walls are built up by polymerization of methyl methacrylate and butanediol diacrylate in the presence of inorganic solid particles as protective colloid.

Organic paraffins are often used as latent heat storage materials; these melt upon exceeding the phase transition. If such microcapsules are used in porous construction materials such as concrete or gypsum, then in the case of capsules with inadequate tightness, a slight escape of paraffins can be observed over a prolonged period. However, exudations of this type are undesired, especially in interiors, and so the object of the present invention is tighter capsules.

Microcapsules with improved tightness are described for example in WO 2008/071649, the walls of which have been crosslinked by means of a crosslinker mixture which comprised 20 to 80% by weight of a polyvinyl monomer. However, the walls comprise up to 70% by weight, based on the total monomers, of methacrylic acid in polymerized-in form. In the case of particle sizes of from 1.5 to 2.5 µm in the textile sector, these capsules exhibit good tightnesses with regard to resistance to cleaning and good rates of evaporation at 180° C.

However, it has been found that microcapsules with capsule sizes of from 1 to 50 µm, as are customarily used in the construction sector, when processed into gypsum construction boards have an unsatisfactory tightness. For example, WO 2011/004006 teaches that modified microcapsule walls built up by polymerization of methyl methacrylate and pentaerythritol tri/tetraacrylate lead to microcapsules with lower emissions in the application temperature range.

However, we searched for further modifications in which the microcapsules in construction applications are low-emission, i.e. have a low evaporation rate and nevertheless have a high heat capacity of >100, in particular of >120 kJ/kg of microcapsules. It was thus an object of the present invention to provide microcapsules which have a high heat capacity and low emissions in the melting range from 22-24° C. or 25-27° C.

Accordingly, microcapsules have been found, comprising a paraffin composition as capsule core and a polymer as capsule wall, which is formed from 40 to 90% by weight of one or more $C_1$-$C_{24}$-alkyl esters of acrylic acid and/or methacrylic acid (monomers I), 10 to 60% by weight of one or more ethylenically unsaturated crosslinkers (monomers II), where at least 80% by weight, based on the ethylenically unsaturated crosslinker, is a crosslinker with three or more ethylenically unsaturated radicals, and 0 to 30% by weight of one or more ethylenically monounsaturated monomers (monomer III) which are different from the monomers I, in each case based on the total weight of the monomers, where the paraffin composition comprises 35 to 98% by weight of n-octadecane, 1 to 10% by weight of at least one $C_{20}$-$C_{24}$-aliphatic and/or diisopropylnaphthalene 1 to 5% by weight of at least one wax with a melting point >40° C. and 0 to 50% by weight of n-hexadecane, in each case based on the paraffin composition.

The application also relates to a process for their preparation and to their use in binding construction materials, textiles and heat transfer liquids. Surprisingly, it has been found that the paraffin composition has an influence on the tightness of the capsules.

The microcapsules according to the invention comprise the paraffin composition according to the invention as capsule core and a polymer as capsule wall. The average particle size of the capsules (D[4,3] by means of light scattering) is 1 to 50 µm. According to a preferred embodiment, the average particle size of the capsules is 1.5 to 15 µm, preferably 3 to 10 µm. Here, preferably 90% of the particles have a particle size of less than twice the average particle size.

The weight ratio of capsule core to capsule wall is generally from 50:50 to 95:5. Preference is given to a core/wall ratio of 70:30 to 93:7.

On account of their paraffin composition, the microcapsules according to the invention in one preferred embodiment have their solid/liquid phase transition in the temperature range from 25-27° C.

In a further preferred embodiment, on account of their paraffin composition, the microcapsules have their solid/liquid phase transition in the temperature range from 22-24° C.

The paraffin composition comprises, as essential components, n-octadecane, at least one $C_{20}$-$C_{24}$-aliphatic and/or diisopropylnaphthalene, and also at least one wax with a melting point ≥40° C., and optionally n-hexadecane in the aforementioned fractions.

According to the invention, the n-octadecane is used in an amount of 35-98, preferably 70-98 and in particular 75-97% by weight, based on the paraffin composition.

The octadecane is generally used as n-octadecane in purities of >90%, as are commercially available. These have a content of n-octadecane, based on their total amount, of >92%, preferably >95%, and are available, for example, under the tradenames Parafol® 18-97 (Sasol Olefins and Surfactants GmbH) or n-octadecane (Chevron Phillips, Roper Thermals).

However, it is also possible to use the octadecane in the form of a C-18 paraffin mixture whose n-octadecane content is at least 40% by weight. If a paraffin mixture is used, the amount of paraffin mixture is chosen such that the amount of n-octadecane present therein is in the range according to the invention. A paraffin mixture is understood as meaning a mixture of alkanes with the general empirical formula $C_nH_{2n+2}$. The number n is in the range from 18 to 32. Paraffin mixtures are obtained from lubricating oil cuts in the vacuum distillation of fossil raw materials and are further purified or obtained by the Fischer-Tropsch process (Sasol, Shell). In the last-mentioned process, predominantly unbranched n-alkanes are obtained. Paraffin mixtures of this type are available for example under the name Linpar 18-20 (Sasol), the composition of which comprises 45-70% by weight of n-octadecane and 4-12% by weight of eicosane.

According to the invention, the $C_{20}$-$C_{24}$-aliphatic and/or diisopropylnaphthalene is used in an amount of 1-10, preferably of 1 to 5% by weight, based on the paraffin composition.

Suitable $C_{20}$-$C_{24}$-aliphatics are n-eicosane, n-tetracosane, and mixture of $C_{20}$-$C_{24}$-aliphatics. By way of example, white oil can be mentioned. White oil is understood as meaning a paraffin oil. Preferred $C_{20}$-$C_{24}$ aliphatics are n-eicosane and diisopropylnaphthalene.

According to the invention, the wax with a melting point≥40° C. is used in an amount of 1-5, preferably of 1 to 3% by weight, based on the paraffin composition. Within the scope of this description, waxes are to be understood as meaning substances which are solid at 20° C. and melt above 40° C. without decomposition. In this connection, they are of low viscosity in the liquid state. Suitable waxes are vegetable waxes such as cotton wax, carnauba wax, candelilla wax, esparto wax, guaruma wax, japan wax, cork wax, montan wax, ouricury wax, rice germ oil wax and sugarcane wax, animal waxes such as beeswax, uropygial gland grease, wool wax, shellac wax (see shellac) and spermaceti mineral waxes; microwaxes, ceresine, ozokerite hard waxes such as hydrogenated jojoba waxes (see jojoba oil), montan wax and sasol waxes hydrocarbon waxes such as polyalkylene waxes (polyolefin waxes, polyethylene waxes, polypropylene waxes), polyethylene glycol waxes and amide waxes.

The addition of the wax with a melting point≥40° C. prevents the crystallization delay which sometimes occurs with the nonpolar substances. Examples of waxes with a melting point≥40° C. which can be mentioned as suitable compounds are Sasolwax 6805, British wax 1357, stearic acid and chloroparaffins.

Hydrocarbon waxes, which include Fischer-Tropsch (FT) waxes (see Fischer-Tropsch paraffins) and the polyolefin waxes, are produced from the raw materials obtained in coal gasification and by petrochemical means by high-pressure, medium-pressure and low-pressure polymerization processes. Fatty acids ($C_{16}$-$C_{22}$) are the basis for mono-, bis- and polyamide waxes.

According to the invention, the n-hexadecane is used in an amount of 0-50, preferably from 0 to 25% by weight, based on the paraffin composition. The addition of the amount of hexadecane is dependent on the desired melting temperature of the paraffin composition. According to one embodiment of a paraffin composition with a melting point of 22-24° C., the n-hexadecane fraction is 5 to 20% by weight. According to another embodiment of a paraffin composition with a melting point of 25-27° C., the n-hexadecane fraction is 0 to 10% by weight, based on the paraffin composition.

Since both n-octadecane and also n-hexadecane are never used in 100% purity, the paraffin composition can comprise other aliphatic impurities which are neither $C_{20}$-$C_{24}$ aliphatics nor a wax with a melting point >40° C., for example aliphatic compounds such as n-heptadecane, n-nonadecane, their stereoisomers and also the stereoisomers of n-octadecane and n-hexadecane. The paraffin composition consists of 35 to 98% by weight of n-octadecane, 1 to 10% by weight of at least one $C_{20}$-$C_{24}$-aliphatic and/or diisopropylnaphthalene, 1 to 5% by weight of at least one wax with a melting point >40° C., up to 50% by weight of n-hexadecane and up to 30, preferably up to 7,% by weight of an aliphatic compound different from these.

Preference is given to a paraffin composition comprising 70 to 98% by weight of n-octadecane, 1 to 10% by weight of at least one $C_{20}$-$C_{24}$-aliphatic and/or diisopropylnaphthalene, 1 to 5% by weight of at least one wax with a melting point >40° C. and 0 to 25% by weight of n-hexadecane, in each case based on the paraffin composition.

The mixture can be prepared from the individual components. However, it is likewise possible that for example the eicosane is metered already in a mixture with the octadecane since in the case of a C-18 paraffin mixture it may already also be present in the octadecane.

Usually, the components of the paraffin composition are mixed beforehand and used in the form of a mixture. Here, it is advisable to heat the mixture to temperatures of from 50 to 100° C. in order to achieve better mixing in the melt. Additionally, it can be stirred. According to one procedure, the octadecane is introduced as initial charge and the other components of the paraffin composition are metered in.

Preferably, the paraffin composition (paraffin composition A) comprises 70 to 85% by weight of n-octadecane, 1 to 10% by weight of at least one $C_{20}$-$C_{24}$-aliphatic and/or diisopropylnaphthalene and 1 to 5% by weight of at least one wax with a melting point >40° C.

5 to 20% by weight of n-hexadecane in each case based on the paraffin composition.

According to a further preferred embodiment, the paraffin composition (paraffin composition B) comprises 85 to 98% by weight of n-octadecane, 1 to 10% by weight of at least one $C_{20}$-$C_{24}$-aliphatic and/or diisopropylnaphthalene and 1 to 5% by weight of at least one wax with a melting point >40° C.

0 to 10% by weight of n-hexadecane in each case based on the paraffin composition.

The polymers of the capsule wall comprise in general at least 40% by weight, in preferred form at least 45% by weight and in particularly preferred form at least 50% by weight, and also in general at most 90% by weight, preferably at most 80% by weight and in particularly preferred form at most 75% by weight, of $C_1$-$C_{24}$-alkyl esters of acrylic acid and/or methacrylic acid (monomers I) in polymerized-in form, based on the total weight of the monomers.

According to the invention, the polymers of the capsule wall generally comprise at least 10% by weight, preferably at least 15% by weight, preferably at least 20% by weight, and in general at most 60% by weight, preferably at most 55% by weight and in particularly preferred form at most 50% by weight, of one or more ethylenically unsaturated crosslinkers (monomers II) in polymerized-in form, based on the total weight of the monomers, where at least 80% by weight, preferably at least 95% by weight, in particular 100%, based on the ethylenically unsaturated crosslinkers, is a crosslinker with three or more ethylenically unsaturated radicals. Preferably, the polymers of the capsule wall comprise, as monomers II, only crosslinkers with three or more ethylenically unsaturated radicals in polymerized-in form.

In addition, the polymers can comprise, in polymerized-in form, up to 30% by weight, preferably up to 20% by weight, in particular up to 10% by weight, particularly preferably 0 to 5% by weight, of one or more ethylenically monounsaturated monomers (monomer III) which are different from the monomers I, based on the total weight of the monomers.

Preference is given to microcapsules according to the invention whose capsule wall is formed from 50 to 70% by weight of one or more $C_1$-$C_{24}$-alkyl esters of acrylic acid and/or methacrylic acid (monomers I), 30 to 50% by weight of one or more ethylenically unsaturated crosslinkers (monomers II), where at least 80% by weight, based on the ethylenically unsaturated crosslinker, is a crosslinker with three or more ethylenically unsaturated radicals, and 0 to 20% by weight of one or more ethylenically monounsaturated monomers (monomer III) which are different from the monomers I, in each case based on the total weight of the monomers.

Preferably, the capsule wall is formed only from monomers of groups I and II.

Suitable monomers I are $C_1$-$C_{24}$-alkyl esters of acrylic acid and/or methacrylic acid. Preference is given to isopropyl, isobutyl, sec-butyl and tert-butyl acrylate and also isopropyl, isobutyl, sec-butyl and tert-butyl methacrylate. Particularly preferred monomers I are methyl, ethyl, n-propyl and n-butyl acrylate and the corresponding methacrylates. In general, the methacrylates are preferred.

Crosslinkers with three or more ethylenically unsaturated radicals are, for example, the polyesters of polyols with acrylic acid and/or methacrylic acid, also the polyallyl and polyvinyl ethers of these polyols. Preference is given to crosslinkers with three or more ethylenically unsaturated radicals, such as trimethylolpropane triacrylate and methacrylate, pentaerythritol triallyl ether, pentaerythritol tetraallyl ether, pentaerythritol triacrylate and pentaerythritol tetraacrylate, and also their technical-grade mixtures. For example, pentaerythritol tetraacrylate is generally present in technical-grade mixtures in a mixture with pentaerythritol triacrylate and smaller amounts of oligomerization products.

Up to 20% by weight of the ethylenically unsaturated crosslinker can be crosslinkers with two ethylenically unsaturated radicals. Preference is given to using crosslinkers with vinyl, allyl, acrylic and/or methacrylic groups. Suitable crosslinkers with two ethylenically unsaturated radicals are, for example, divinylbenzene and divinylcyclohexane and preferably the diesters of diols with acrylic acid or methacrylic acid, also the diallyl and divinyl ethers of these diols. By way of example, mention may be made of ethanediol diacrylate, ethylene glycol dimethacrylate, 1,3-butylene glycol dimethacrylate, diethylene glycol diacrylate, dipropylene glycol diacrylate, methallylmethacrylamide, allyl acrylate and allyl methacrylate. Particular preference is given to propanediol diacrylate, butanediol diacrylate, pentanediol diacrylate and hexanediol diacrylate and the corresponding methacrylates.

Suitable monomers III are ethylenically monounsaturated monomers (monomer III) which are different from the monomers I. Suitable monomers III are monounsaturated monomers such as vinyl acetate, vinyl propionate, vinylpyridine and styrene or α-methylstyrene, acrylic acid, methacrylic acid, maleic acid, fumaric acid, itaconic acid, vinylphosphonic acid, maleic anhydride, 2-hydroxyethyl acrylate and methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate and diethylaminoethyl methacrylate. Preferably, vinyl acetate, vinyl propionate, vinylpyridine, styrene, α-methylstyrene and acrylic acid and methacrylic acid are suitable.

The microcapsules according to the invention can be prepared by a so-called in-situ polymerization. The principle of microcapsule formation is based on the fact that the monomers, free-radical initiators, protective colloid and the lipophilic substance to be encapsulated are used to prepare an oil-in-water emulsion in which the monomers and the paraffin composition are present as disperse phase. According to one embodiment, it is possible to add the free-radical initiator only after the dispersion. The polymerization of the monomers is then triggered by heating and it is optionally controlled by increasing the temperature further, whereupon the resulting polymers form the capsule wall which surrounds the paraffin composition. This general principle is described for example in DE-A-10 139 171, to the content of which reference is expressly made.

As a rule, the microcapsules are prepared in the presence of at least one organic and/or inorganic protective colloid. Both organic and inorganic protective colloids may be ionic or neutral. Protective colloids can be used here either individually or else in mixtures of two or more identically or differently charged protective colloids. Preferably, the microcapsules are prepared in the presence of an inorganic protective colloid, in particular in combination with an organic protective colloid.

Organic protective colloids are preferably water-soluble polymers which reduce the surface tension of water from 73 mN/m at most to 45 to 70 mN/m and thus ensure the formation of closed capsule walls, and also form microcapsules with preferred particle sizes in the range from 0.5 to 50 μm, preferably 0.5 to 30 μm and in particular 0.5 to 10 μm.

Organic anionic protective colloids are sodium alginate, polymethacrylic acid and its copolymers, the copolymers of sulfoethyl acrylate and methacrylate, sulfopropyl acrylate and methacrylate, of N-(sulfoethyl)maleimide, of 2-acrylamido-2-alkylsulfonic acids, styrenesulfonic acid and also of vinylsulfonic acid. Preferred organically anionic protective colloids are naphthalenesulfonic acid and naphthalenesulfonic acid-formaldehyde condensates, and in particular polyacrylic acids and phenylsulfonic acid-formaldehyde condensates.

Organic neutral protective colloids are, for example, cellulose derivatives such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, casein, polyethylene glycols, polyvinyl alcohol and partially hydrolyzed polyvinyl acetates, and methylhydroxypropylcellulose. Preferred organic neutral protective colloids are polyvinyl alcohol and partially hydrolyzed polyvinyl acetate, and methylhydroxy($C_1$-$C_4$)-alkylcellulose.

According to the present invention, preference is given to using a combination of an $SiO_2$-based protective colloid and a methylhydroxy-($C_1$-$C_4$)-alkylcellulose. In this connection, it has been found that the combination with a low molecular weight methylhydroxy-($C_1$-$C_4$)-alkylcellulose leads to advantageous properties. According to the invention, a methylhydroxy-($C_1$-$C_4$)-alkylcellulose with an average molecular weight (weight-average)≤50 000 g/mol, preferably from the range from 5000 to 50 000 g/mol, preferably from 10 000 to 35 000 g/mol, in particular 20 000 to 30 000 g/mol, is used.

Methylhydroxy-($C_1$-$C_4$)-alkylcellulose is to be understood as meaning methylhydroxy($C_1$-$C_4$)-alkylcellulose with highly diverse degrees of methylation and also degrees of alkoxylation.

Methylhydroxy-($C_1$-$C_4$)-alkylcelluloses are prepared in a known manner by two reaction steps. In one step, the alkoxylation of cellulose with alkylene oxides takes place. In the second step, the methylation of hydroxyl groups that are present takes place with a methyl halide. These two reactions generally take place in succession, but can also be carried out simultaneously. Depending on the stoichiometry of the employed alkylene oxides and alkylating agents relative to the cellulose, the degree of substitution of the cellulose varies. The average degree of substitution (DS) indicates how many hydroxyl units have on average been etherified on one dehydroglucose unit and can be from 0 to 3. The molar degree of substitution (MS) indicates the average number of alkoxy units per dehydroglucose unit and may also be greater than 3 as a result of the formation of side chains during the alkoxylation.

The preferred methylhydroxy-$(C_1$-$C_4)$-alkylcelluloses have an average degree of substitution DS of from 1.1 to 2.5 and a molar degree of substitution MS of from 0.03 to 0.9.

Suitable methylhydroxy-$(C_1$-$C_4)$-alkylcelluloses are, for example, methylhydroxyethylcellulose or methylhydroxypropylcellulose. Particular preference is given to methylhydroxypropylcellulose. Methylhydroxy-$(C_1$-$C_4)$-alkylcelluloses of this type are available, for example, under the trade names Culminal® from Hercules/Aqualon.

Preferably, the microcapsules are prepared by preparing an oil-in-water emulsion comprising, as essential constituents, the monomers, free-radical initiator, inorganic protective colloid and the lipophilic substance to be encapsulated, and triggering the polymerization. The polymerization is optionally controlled by increasing the temperature, where the polymers that are produced form the capsule wall which surrounds the paraffin composition.

The inorganic protective colloid is preferably inorganic solid particles so-called Pickering systems. Such a Pickering system can consist here of the solid particles on their own or additionally of auxiliaries which improve the dispersibility of the particles in water or the wettability of the particles by the lipophilic phase. The mode of action and its use is described in EP-A-1 029 018 and EP-A-1 321 182, to the content of which reference is expressly made.

The inorganic solid particles may be metal salts, such as salts, oxides and hydroxides of calcium, magnesium, iron, zinc, nickel, titanium, aluminum, silicon, barium and manganese. Mention is to be made of magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to $SiO_2$-based silicas, magnesium pyrophosphate and tricalcium phosphate.

Suitable $SiO_2$-based protective colloids are highly disperse silicas. They can be dispersed as fine, solid particles in water. However, it is also possible to use so-called colloidal dispersions of silica in water. Such colloidal dispersions are alkaline, aqueous mixtures of silica. In the alkaline pH range, the particles are swollen and stable in water. For a use of these dispersions as protective colloid, it is advantageous if the pH of the oil-in-water emulsion is adjusted to pH 2 to 7 using an acid. Preferred colloidal dispersions of silica have a specific surface area in the range from 70 to 90 $m^2/g$ at pH 9.3.

Preferred $SiO_2$-based protective colloids are highly disperse silicas whose average particle sizes are in the range from 40 to 150 nm at pH values in the range from 8-11. By way of example, mention may be made of Levasil® 50/50 (H. C. Starck), Köstrosol® 3550 (CWK Bad Köstritz), and Bindzil® 50/80 (Akzo Nobel Chemicals).

According to one preferred embodiment, a combination of an $SiO_2$-based protective colloid and a methylhydroxy-$(C_1$-$C_4)$-alkylcellulose is used. In this connection, it has been found that the combination with a low molecular weight methylhydroxy-$(C_1$-$C_4)$-alkylcellulose leads to advantageous properties. According to the invention, a methylhydroxy-$(C_1$-$C_4)$-alkylcellulose with an average molecular weight (weight-average) of ≤50 000 g/mol, preferably from the range from 5000 to 50 000 g/mol, preferably from 10 000 to 35 000 g/mol, in particular 20 000 to 30 000 g/mol, is used.

In general, the protective colloids are used in amounts of from 0.1 to 25% by weight, preferably 0.1 to 20% by weight, preferably from 0.5 to 15% by weight, based on the sum of paraffin composition and monomers.

For inorganic protective colloids, preference is given here to choosing amounts of from 0.5 to 20, preferably 0.5-18% by weight, based on the sum of paraffin composition and monomers.

Organic protective colloids are preferably used in amounts of from 0.1 to 10% by weight, based on the microcapsules (core and wall). The methylhydroxy-$(C_1$-$C_4)$-alkylcellulose used, according to one preferred embodiment, in combination with an $SiO_2$-based protective colloid is preferably used here in an amount of from 0.01% by weight to 1.0% by weight, in particular from 0.05% by weight to 0.1% by weight, based on the sum of paraffin composition and monomers.

Free-radical initiators which can be used for the free-radical polymerization reaction are the customary oil-soluble peroxo and azo compounds, expediently in amounts of from 0.2 to 5% by weight, based on the weight of the monomers. In this connection, oil-soluble is to be understood as meaning that the free-radical initiator is a constituent of the oil phase in the oil-in-water emulsion where it triggers the polymerization.

Depending on the state of aggregation of the free-radical initiator and its solubility behavior, it can be introduced as such, but preferably as solution, emulsion or suspension, whereby in particular small quantitative amounts of free-radical initiator can be dosed more precisely.

Preferred free-radical initiators to be mentioned are tert-butyl peroxoneodecanoate, tert-amyl peroxypivalate, dilauroyl peroxide, tert-amyl peroxy-2-ethylhexanoate, 2,2'-azobis(2,4-dimethyl)valeronitrile, 2,2'-azobis(2-methylbutyronitrile), dibenzoyl peroxide, tert-butyl per-2-ethylhexanoate, di-tert-butyl peroxide, 2,5-dimethyl-2,5-di (tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate, dilauroyl peroxide, tert-butyl peroxoneodecanoate and dimethyl 2,2-azobisisobutyrate. These have a half-life of 10 hours in a temperature range from 30 to 100° C.

Furthermore, it is possible to add regulators known to the person skilled in the art in customary amounts to the polymerization, such as tert-dodecyl mercaptan or ethylhexyl thioglycolate.

As a rule, the polymerization is carried out at 20 to 100° C., preferably at 40 to 95° C. Depending on the desired paraffin composition, the oil-in-water emulsion is to be formed at a temperature at which the core material is liquid/oily. Accordingly, it is necessary to select a free-radical initiator whose decomposition temperature is above this temperature, and to likewise carry out the polymerization 2 to 50° C. above this temperature, and so, free-radical initiators are optionally selected whose decomposition temperature is above the melting point of the paraffin composition.

A customary process variant for paraffin compositions with a melting point up to about 60° C. is a reaction temperature starting at 45° C. which is increased to 85° C. in the course of the reaction. Advantageous free-radical initiators have a 10-hour half-life in the range from 45 to 65° C., such as t-butyl perpivalate.

The polymerization is expediently undertaken at atmospheric pressure, although it is also possible to work at reduced or slightly increased pressure, for example at a polymerization temperature above 100° C., thus approximately in the range from 0.5 to 5 bar.

The reaction times for the polymerization are normally 1 to 10 hours, in most cases 2 to 5 hours.

After the actual polymerization reaction, for a conversion of 90 to 99% by weight, it is generally advantageous to arrange for the aqueous microcapsule dispersions to be largely free from odor carriers, such as residual monomers and other volatile organic constituents. This can be achieved in a manner known per se by physical means through distillative removal (in particular via steam distillation) or by stripping off with an inert gas. In addition, it can take place by chemical means, as described in WO 99/24525, advantageously by redox-initiated polymerization, as described in DE-A 44 35 423, DE-A 44 19 518 and DE-A 44 35 422.

Moreover, in order to reduce the residual monomer content, according to one embodiment, addition of further free-radical initiator is required, which defines the start of the post-polymerization. According to one preferred embodiment, after the capsule formation, a post-polymerization is triggered with salts of peroxodisulfuric acid as free-radical initiators.

Suitable salts are in particular ammonium, sodium and potassium peroxodisulfuric acid.

The alkali metal salts of peroxodisulfuric acid are water-soluble and initiate the post-polymerization in the and/or from the water phase. The salts of peroxodisulfuric acid are used expediently in amounts of from 0.2 to 5% by weight, based on the weight of the monomers. Here, it is possible to add them in one go or over a certain period.

The temperature for the post-polymerization is usually 60 to 100° C. The post-polymerization time is generally 0.5 to 5 hours.

According to this preferred embodiment with a post-polymerization using one or more salts of peroxodisulfuric acid as free-radical initiator the result is particularly low-odor microcapsules.

If necessary, the post-polymerization can also be carried out at lower temperatures by adding reducing agents such as sodium bisulfite. The addition of reducing agents can further reduce the residual monomer content.

Compared with customary post-polymerization initiators consisting of organic, water-soluble peroxo or azo compounds such as tert-butyl hydroperoxide, the rate of decomposition of which can optionally be increased by adding a reducing agent such as ascorbic acid, the salts of peroxodisulfuric acid in the end product exhibit considerably smaller amounts of odor carriers such as, for example, aldehydes.

In this way, it is possible to produce microcapsules with an average particle size in the range from 0.5 to 100 μm, where the particle size can be adjusted in a manner known per se by the shear force, the stirring speed, and its concentration. Preference is given to microcapsules with an average particle size in the range from 0.5 to 50 μm, preferably 0.5 to 30 μm, in particular 3 to 10 μm, in particular 3 to 7 μm (D[4,3] by means of light scattering).

The microcapsules according to the invention can be processed directly as aqueous microcapsule dispersion or in the form of a powder. The microcapsules according to the invention can optionally then be isolated by spray-drying.

The spray-drying of the microcapsule dispersion can take place in a customary manner. In general, the procedure is such that the inlet temperature of the warm-air stream is in the range from 100 to 200° C., preferably from 120 to 160° C., and the starting temperature of the warm-air stream is in the range from 30 to 90° C., preferably 60 to 80° C. The spraying of the aqueous polymer dispersion in the warm-air stream can take place for example by means of one-substance or multi-substance nozzles or a rotating disk. The polymer powder is normally deposited using cyclones or filter separators. The sprayed aqueous polymer dispersion and the warm-air stream are preferably introduced in parallel.

For the spray-drying, spray auxiliaries are optionally added in order to facilitate the spray-drying, or to establish certain powder properties, e.g. lack of dust, flowability or improved redispersibility. The person skilled in the art is familiar with a large number of spray auxiliaries. Examples thereof can be found in DE-A 19629525, DE-A 19629526, DE-A 2214410, DE-A 2445813, EP-A 407889 or EP-A 784449. Advantageous spray auxiliaries are, for example, water-soluble polymers of the polyvinyl alcohol type or partially hydrolyzed polyvinyl acetates, cellulose derivatives such as hydroxyethylcellulose, carboxymethylcellulose, methylcellulose, methylhydroxyethylcellulose and methylhydroxypropylcellulose, starch, polyvinylpyrrolidone, copolymers of vinylpyrrolidone, gelatin, preferably polyvinyl alcohol and partially hydrolyzed polyvinyl acetates, and methylhydroxypropylcellulose. Preference is given to working without the addition of spray auxiliaries.

The microcapsule powders according to the invention and/or the microcapsule dispersion can be used in diverse ways as latent heat storage material. Latent heat storage materials are defined as substances which have a phase transition in the temperature range in which a heat transfer is to be undertaken. According to the object of the present invention, the microcapsules according to the invention have their solid/liquid phase transition in the temperature ranges from 22-24° C. and 25-27° C. The microcapsules according to the invention have a high enthalpy of melt and exhibit high tightnesses.

A broad field of application for the microcapsules according to the invention is their use as latent heat storage material in binding construction materials with mineral, silicatic or polymeric binders. A distinction is made here between moldings and coating compositions. Thus, they are characterized by their hydrolysis stability towards the aqueous and often alkaline aqueous materials.

Mineral moldings are described in WO 2011/004006, to the disclosure of which reference is expressly made.

The microcapsules according to the invention are suitable for the modification of mineral binding construction materials (mortar-like preparations) which comprise a mineral binder which consists of 70 to 100% by weight of cement and 0 to 30% by weight of gypsum. This is true particularly when cement is the sole mineral binder. As regards further details, reference may be made to WO 2011/004006 and DE-A 196 23 413. Typically, the dry compositions of mineral binding construction materials comprise, based on the amount of mineral binder, 0.1 to 50% by weight, preferably 5 to 40% by weight, particularly preferably 10 to 30% by weight, of microcapsules.

The microcapsules according to the invention are preferably used as additive in mineral coating compositions such as plaster. Such a plaster for the interior sector is usually composed of gypsum as binder. As a rule, the gypsum/microcapsule weight ratio is from 95:5 to 70:30. Higher microcapsule fractions are of course possible.

Coatings for the exterior sector such as external façades or wet rooms can comprise cement (cementitious plasters), lime or waterglass (mineral or silicate plasters) or plastics dispersions (synthetic resin plasters) as binders together with fillers and optionally pigments for imparting color. The fraction of microcapsules in the overall solid corresponds to the weight ratios for gypsum plasters.

In addition, the microcapsules according to the invention are suitable as additive in polymeric moldings or polymeric coating compositions. These are to be understood as meaning thermoplastic and thermosetting plastics, during the processing of which the microcapsules are not destroyed. Examples are epoxy, urea, melamine, polyurethane and silicone resins and also coatings, both solvent-based, high-solid based, powder coating or water-based coating and dispersion films. The microcapsule powder is also suitable for incorporation into plastic foams and fibers. Examples of foams are polyurethane foam, polystyrene foam, latex foam and melamine resin foam.

Furthermore, the microcapsules according to the invention are suitable as additive in lignocellulose-containing moldings, such as chipboards, MDF and HDF boards, cork boards or OSBs, as described in WO2005/116559, to which reference is expressly made.

Advantageous effects can also be achieved when the microcapsules according to the invention are processed in mineral moldings which are foamed.

A particularly preferred embodiment for the incorporation of the microcapsules in mineral binders is the modification of gypsum construction boards or magnesia boards as is described in PCT/EP2010/059888 (WO 2011/004006), to which reference is expressly made.

Furthermore, the microcapsules according to the invention are advantageously suitable as latent heat storage materials for modifying fibers and textile articles, as described in WO 2011/004006, to the disclosure of which reference is expressly made. In addition, the microcapsules according to the invention are suitable as latent heat storage materials for producing heat transfer liquid. Within the context of this application, the term heat transfer liquid is understood as meaning both liquids for heat transport and also liquids for cold transport, i.e. cooling liquids. The principle of the transfer of heat energy is identical in both cases and differs merely in the direction of transfer.

The examples below are intended to illustrate the invention in more detail. Unless stated otherwise, the percentages in the examples are percentages by weight.

The particle size of the microcapsule dispersion was determined using a Malvern Particle Sizer model 3600E or a Malvern Mastersizer 2000 in accordance with a standard measuring method which is documented in the literature. The D[v, 0.1] value means that 10% of the particles have a particle size (in accordance with the volume average) up to this value. Accordingly, D[v, 0.5] means that 50% of the particles and D[v, 0.9] means that 90% of the particles have a particle size (according to the volume average) less than/equal to this value. The span value arises from the quotient from the difference D[v, 0.9]–D[v, 0.1] and D[v, 0.5]. The D[4.3] value is the weight-average.

Determination of the evaporation rate at 180° C. (ER)

For the pretreatment, 2 g of the microcapsule dispersion were dried in a small metal dish for two hours at 105° C. in order to remove any residual water. The weight ($m_o$) was then determined. After heating for one hour at 180° C. and cooling, the weight ($m_1$) was determined. The weight difference ($m_0 - m_1$), based on $m_0$ and multiplied by 100, gives the evaporation rate in %. The lower the value, the tighter the microcapsules.

It must be ensured here that comparisons in the evaporation rate should always be carried out on comparable capsule sizes and stabilizer systems.

Determination of the TVOC/SVOC Values using "Field and Laboratory Emission Cell" Measurement (FLEC Measurement)

The emission of VOC (volatile organic compounds) from gypsum boards is ascertained following defined storage with the help of a FLEC measurement and determined by a GC/MS system qualitatively and quantitatively in accordance with DIN ISO 16000-6, DIN ISO16000-10 and DIN ISO 16017-1. During the course of the measurement, the gypsum board is conditioned in a metal frame (internal dimensions: 10.5× 14.0×1.5 cm) including base plate initially for 24 hours at 30° C. in a drying cabinet (Heraeus T 5042 EK). The board with frame and base plate is then placed in a drying cabinet with gas sampler (Desaga GS 312) and temperature measurement unit, and 10 l of prepurified air are allowed to flow over the board in a laminar manner via a FLEC attachment with seal lying on the frame. The exit air is conveyed via an adsorption tube filled with Tenax TA. The VOC emitted from the board are then thermally desorbed from the Tenax tubes (thermodesorber: Turbomatrix ATD from Perkin Elmer with GC 6890 and MS 5973 from Agilent or thermodesorber TD20 with GC/MS-QP 2010 S from Shimadzu) and analyzed on a gas chromatograph, as known to the person skilled in the art.

Production of the Gypsum Board for the FLEC Measurement 217.0 g of plaster of Paris, 0.34 g of accelerator and 1.7 g of starch were mixed and scattered in ca. 15 seconds onto the surface of an aqueous phase consisting of 109.4 g of water, 203.0 g of microcapsule dispersion of the respective example (solids content ~42% by weight), 1.7 g of liquefier and 0.2 g of Tego Foamex 1488. A whisk was then used to mix for a further 30 seconds so that the gypsum slurry mixture was produced in a total of 45 seconds. The gypsum slurry was poured into a metal frame (internal dimension 10.5×14) (a glass web was placed beforehand on the base of the metal frame), smoothed out, a glass web is placed on the surface, and pressed using a rolling pin. After 30 minutes at room temperature, the board was dried in a fume cupboard for 30 minutes at 170° C. and for one hour at 105° C. The board was then post-dried for ca. 15 hours at 40° C.

EXAMPLES

Example 1a

Water Phase:

680 g of water 165 g of a 50% strength by weight silica sol (specific surface area ca. 80 m$^2$/g)

8 g of a 5% strength by weight aqueous solution of methylhydroxypropylcellulose with an average molecular weight of 26 000 g/mol 2.1 g of a 2.5% strength by weight aqueous sodium nitrite solution 4.2 g of a 20% strength by weight nitric acid solution in water Oil Phase:

311.6 g of Linpar 18-20 (C-18 paraffin mixture comprising n-octadecane and eicosane)

9.6 g of eicosane 110 g of n-hexadecane (technical-grade)

8.8 g of a technical-grade paraffin wax with a melting point of ca. 65° C.

66.0 g of methyl methacrylate 44.0 g of pentaerythritol tetraacrylate (technical-grade, Cytec)

The gas chromatographic analysis (gas chromatograph: Agilent 5890 Ser. 2, column: Agilent 30 m DB1, internal diameter 0.25 mm, 0.25 μm film thickness) of the paraffin composition revealed, as composition, 37.5% by weight of n-octadecane, 7.6% by weight of eicosane, 24.7% by weight of n-hexadecane, 9.3% by weight of heptadecane, 16.8% by weight of nonadecane, 1.3% by weight of heneicosane, 0.3% by weight of docosane and 2.5% by weight of remainder.

Addition 1:
1.5 g of a 75% strength solution of t-butyl perpivalate in aliphatic hydrocarbons
1.1 g of water Feed 1:
22.0 g of a 5% strength by weight aqueous Na peroxodisulfate solution
30.0 g of water The water phase was introduced as initial charge at 40° C.; the molten and homogeneously mixed oil phase was added to this and the mixture was dispersed for 40 minutes in a high-speed dissolver stirrer (disk diameter 5 cm) at 3500 rpm. Addition 1 was added. The emulsion was heated with stirring using an anchor stirrer over 60 minutes to 67° C., over the course of a further 60 minutes to 90° C. With stirring, feed 1 was metered into the resulting microcapsule dispersion over 90 minutes at 90° C. and then the mixture was stirred for 60 minutes at this temperature. It was then cooled to room temperature and neutralized with aqueous sodium hydroxide solution.

A microcapsule dispersion with an average particle size D [4,3] of 5.2 μm and a solids content of 43% was obtained. The evaporation rate (2 h at 105° C., 1 h at 180° C.) was 29.1%.

By adding thickeners after cooling to room temperature, it is possible to prevent creaming in a manner known per se.

Examples 1b and 1c

Microcapsules were produced analogously to example 1a by merely replacing the eicosane with the same amount of Baysilone oil (example 1b—not according to the invention) or white oil (example 1c). The fraction of inorganic protective colloid in all examples is 15% by weight, based on the solid. The solids content of the microcapsule dispersion, the microcapsule size, the evaporation rate (ER), and the heat capacity and the emission in a gypsum board can be found in table 1.

TABLE 1

Properties of the microcapsules

| Example No. | SC [%] | ER [%] | D [4,3] | m.p. [° C.] | Heat capacity [J/g] | FLEC emission (SVOC) [μg/m³] |
|---|---|---|---|---|---|---|
| 1a | 43 | 29.1 | 5.2 μm | 23.6 | 100.6 | |
| 1b n.i. | 43.4 | 51.5 | 4.5 μm | | | 457 |
| 1c | 43.2 | 52.2 | 4.0 μm | 23.4 | 120 | 39 | n.i. not according to the invention

Example 2a

Water Phase:
680 g of water
192.5 g of a 50% strength by weight silica sol (specific surface area ca. 80 m²/g)
8 g of a 5% strength by weight aqueous solution of methylhydroxypropyl-cellulose with an average molecular weight of 26 000 g/mol
2.1 g of a 2.5% strength by weight aqueous sodium nitrite solution
4.0 g of a 20% strength by weight nitric acid solution in water Oil Phase:
352 g of n-octadecane
13.2 g of diisopropylnaphthalene
66 g of hexadecane (technical-grade)
8.8 g of a technical-grade paraffin wax with a melting point of ca. 65° C.
66.0 g of methyl methacrylate
44.0 g of pentaerythritol tetraacrylate (technical-grade, Cytec)

Addition 1:
1.5 g of a 75% strength solution of t-butyl perpivalate in aliphatic hydrocarbons
1.1 g of water Feed 1:
22.0 g of a 5% strength by weight aqueous Na peroxodisulfate solution
30.0 g of water The reaction was carried out as described in example 1.

A microcapsule dispersion with an average particle size D [4,3] of 3.8 μm and a solids content of 43.2% was obtained. The evaporation rate (2 h at 105° C., 1 h at 180° C.) was 14%. The SVOC values measured in the FLEC were 58 μg/m³.

Examples 2a-c

Microcapsules were produced analogously to example 2a by merely replacing the diisopropylnaphthalene with the same amount of white oil (example 2b) or naphthalene (example 2c—not according to the invention). The fraction of the inorganic protective colloid in all examples is 17.5% by weight, based on the use amount of monomers and paraffin composition. The solids content of the microcapsule dispersion, the microcapsule size, the evaporation rate (ER), and also the heat capacity and the emission in a gypsum board can be found in table 2.

TABLE 2

Properties of the microcapsules

| Example No. | SC [%] | ER [%] | D [4,3] | m.p. [° C.] | Heat capacity [J/g] | FLEC emission (SVOC) [μg/m³] |
|---|---|---|---|---|---|---|
| 2a | 43.2 | 14 | 3.8 μm | 24.1 | 123.5 | 58 |
| 2b | 43.4 | 39 | 3.8 μm | 24.5 | 128.3 | 100 |
| 2c n.i. | 42.5 | 37.5 | 3.5 μm | 24.1 | 131.1 | 233 | n.i. not according to the invention

Example 3—Not According to the Invention

Water Phase:
598.4 g of water
145.2 g of a 50% strength by weight silica sol (specific surface area ca. 80 m²/g)
7 g of a 5% strength by weight aqueous solution of methylhydroxypropylcellulose with an average molecular weight of 26 000 g/mol
1.9 g of a 2.5% strength by weight aqueous sodium nitrite solution 3.7 g of a 20% strength by weight nitric acid solution in water
Oil Phase:
379.5 g of n-octadecane
7.7 g of a technical-grade paraffin wax with a melting point of ca. 65° C.
58.1 g of methyl methacrylate
38.7 g of pentaerythritol tetraacrylate (technical-grade, Cytec)
Addition 1:
1.5 g of a 75% strength solution of t-butyl perpivalate in aliphatic hydrocarbons
1.1 g of water
Feed 1:
19.4 g of a 5% strength by weight aqueous Na peroxodisulfate solution
26.4 g of water The reaction was carried out as described in example 1.

A microcapsule dispersion with an average particle size D [4,3] of 3.7 μm and a solids content of 43.2% was obtained. The evaporation rate (2 h at 105° C., 1 h at 180° C.) was 48.3%. The SVOC values measured in the FLEC were 307 μg/m$^3$.

Example 4a

Water Phase:
680 g of water
165 g of a 50% strength by weight silica sol (specific surface area ca. 80 m$^2$/g)
8 g of a 5% strength by weight aqueous solution of methylhydroxypropylcellulose with an average molecular weight of 26 000 g/mol
2.1 g of a 2.5% strength by weight aqueous sodium nitrite solution
4.1 g of a 20% strength by weight nitric acid solution in water
Oil Phase:
418.3 g of n-octadecane
12.9 g of eicosane
8.8 g of a technical-grade paraffin wax with a melting point of ca. 65° C.
66.0 g of methyl methacrylate
44.0 g of pentaerythritol tetraacrylate (technical-grade, Cytec)
Addition 1:
1.5 g of a 75% strength solution of t-butyl perpivalate in aliphatic hydrocarbons
1.1 g of water
Feed 1:
22.0 g of a 5% strength by weight aqueous Na peroxodisulfate solution
30.0 g of water The reaction was carried out as described in example 1.

A microcapsule dispersion with an average particle size D [4,3] of 4.0 μm and a solids content of 43% was obtained. The evaporation rate (2 h at 105° C., 1 h at 180° C.) was 41.1%. The SVOC values measured in the FLEC were 60 μg/m$^3$.

Examples 4b-4g

Microcapsules were produced analogously to example 4a by merely replacing the eicosane. The fraction of the inorganic protective colloid in all of the examples is 15% by weight, based on the use amount of monomers and paraffin composition. The solids content of the microcapsule dispersion, the microcapsule size, the evaporation rate (ER), and also the heat capacity and the emission in a gypsum board can be found in table 3.

TABLE 3

Properties of the microcapsules

| Example No. | n-aliphatic | SC [%] | ER [%] | D [4,3] | m.p. [° C.] | Heat capacity [J/g] | FLEC emission (SVOC) [μg/m$^3$] |
|---|---|---|---|---|---|---|---|
| 4a | Eicosane | 43 | 41.1 | 4.0 μm | 26.6 | 143.1 | 60 |
| 4b | with tetracosane | 43.5 | 48.7 | 4.2 μm | | | 199. |
| 4c n.i. | Polyisobutene with average MW 75 000 g/mol B15 | 43.4 | 32.3 | 4.1 μm | 14.7 | 93.6 | 304 |
| 4d n.i. | Polyisobutene, MW 1000 g/mol | 43.6 | 28.3 | 3.9 μm | 27.5 | 146.1 | 404 |
| 4e n.i. | Polyisobutene, MW 2300 g/mol | 43.5 | 23.7 | 5.4 μm | | | 594 |
| 4f n.i. | with Luwax LG | 42.1 | 56.8 | 4.1 μm | | | 1090 |
| 4g n.i. | Polyoctadecyl vinyl ether | 43.1 | 36.5 | 3.8 μm | | | 692 | n.i. not according to the invention,
MW average molecular weight

Luwax LG: montan wax ester, octacosanoic acid transesterified with natural alcohols The examples show that polymeric waxes instead of C$_{20-24}$ aliphatics lead to poor results.

Example 5

Water Phase:
680 g of water
165 g of a 50% strength by weight silica sol (specific surface area ca. 80 m$^2$/g)
8 g of a 5% strength by weight aqueous solution of methylhydroxypropylcellulose with an average molecular weight of 26 000 g/mol 2.1 g of a 2.5% strength by weight aqueous sodium nitrite solution
4.1 g of a 20% strength by weight nitric acid solution in water
Oil Phase:
321.2 g of n-octadecane
88 g of n-hexadecane
22 g of eicosane
8.8 g of a technical-grade paraffin wax with a melting point of ca. 65° C.
66.0 g of methyl methacrylate
44.0 g of pentaerythritol tetraacrylate (technical-grade, Cytec)
Addition 1:
1.5 g of a 75% strength solution of t-butyl perpivalate in aliphatic hydrocarbons
1.1 g of water
Feed 1:
22.0 g of a 5% strength by weight aqueous Na peroxodisulfate solution
30.0 g of water The reaction was carried out as described in example 1.

A microcapsule dispersion with an average particle size D [4,3] of 3.9 μm and a solids content of 44.6% was obtained. The evaporation rate (2 h at 105° C., 1 h at 180° C.) was 36.6%. The SVOC values measured in the FLEC were 118 μg/m³.

With regard to the aforementioned teachings, numerous changes and deviations from the present invention are possible. It can therefore be assumed that the invention, within the scope of the attached claims, can be executed in ways which differ from those specifically described herein.

We claim:

1. A microcapsule comprising a paraffin composition as capsule core and a polymer as capsule wall, which is formed from
   40 to 90% by weight of one or more $C_1$-$C_{24}$-alkyl esters of acrylic acid and/or methacrylic acid (monomers I),
   10 to 60% by weight of one or more ethylenically unsaturated crosslinkers (monomers II), where at least 80% by weight, based on the ethylenically unsaturated crosslinker, is a crosslinker with three or more ethylenically unsaturated radicals, and
   0 to 30% by weight of one or more ethylenically monounsaturated monomers (monomer III) which are different from the monomers I,
   in each case based on the total weight of the monomers, wherein the paraffin composition comprises
   35 to 98% by weight of n-octadecane,
   1 to 10% by weight of at least one of eicosane and diisopropylnaphthalene
   1 to 5% by weight of at least one wax with a melting point >40° C. and more than 0 and up
   to 50% by weight of n-hexadecane,
   in each case based on the paraffin composition, and
   wherein the ethylenically unsaturated crosslinker with three or more ethylenically unsaturated radicals is selected from the group consisting of trimethylolpropane triacrylate and methacrylate, pentaerythritol triallyl ether, pentaerythritol tetraallyl ether, pentaerythritol triacrylate and pentaerythritol tetraacrylate, and their technical-grade mixtures.

2. The microcapsule according to claim 1, wherein the microcapsule has an average particle size of from 1.5 to 15 μm and 90% of the particles have a particle size of less than twice the average particle size.

3. The microcapsule according to claim 1, wherein the paraffin composition comprises 70-98% by weight of n-octadecane.

4. The microcapsule according to claim 1, wherein the paraffin composition comprises more than 0 and up to 25% by weight of n-hexadecane.

5. The microcapsule according to claim 1, wherein the paraffin composition comprises
   70 to 98% by weight of n-octadecane,
   1 to 10% by weight of at least one of eicosane and diisopropylnaphthalene,
   1 to 5% by weight of at least one wax with a melting point >40° C. and more than 0 and up
   to 50% by weight of n-hexadecane,
   in each case based on the paraffin composition.

6. The microcapsule according to claim 1, obtainable by preparing an oil-in-water emulsion comprising the monomers, free-radical initiator, inorganic protective colloid and the paraffin composition, and triggering the polymerization.

7. The microcapsule according to claim 1, obtainable by preparing an oil-in-water emulsion, comprising the monomers, free-radical initiator, inorganic protective colloid and the paraffin composition, and triggering the polymerization, where the fraction of inorganic protective colloid is 0.5-20% by weight, based on the sum of paraffin composition and monomers.

8. The microcapsule according to claim 1 in the form of an aqueous dispersion.

9. A process for producing microcapsules according to claim 1, wherein an oil-in-water emulsion is prepared from monomers, free-radical initiators, protective colloid and the paraffin composition, and the polymerization of the monomers is triggered by heating and is optionally controlled by increasing the temperature further.

10. A construction material comprising the microcapsules according to claim 1 as a latent heat storage material.

11. A textile comprising the microcapsules according to claim 1 as a latent heat storage material.

12. A heat transfer liquid comprising the microcapsule dispersion according to claim 1 as a latent heat storage material.

13. The microcapsule according to claim 1, wherein the paraffin composition comprises diisopropylnaphthalene.

14. The microcapsule according to claim 5, wherein the paraffin composition comprises diisopropylnaphthalene.

15. The microcapsule according to claim 1, which has a heat capacity of greater than 100 kJ/kg.

16. The microcapsule according to claim 1, which has a heat capacity of greater than 120 kJ/kg.

17. The microcapsule according to claim 1, which has a solid/liquid phase transition in the temperature range from 25-27° C.

18. The microcapsule according to claim 1, which has a solid/liquid phase transition in the temperature range from 22-24° C.

19. The microcapsule according to claim 1, wherein the paraffin composition comprises eicosane.

20. The microcapsule according to claim 5, wherein the paraffin composition comprises eicosane.

* * * * *